United States Patent [19]

Laganà et al.

[11] 4,334,954
[45] Jun. 15, 1982

[54] APPARATUS FOR DESALTING SEA WATER OR BRACKISH WATER

[75] Inventors: Vincenzo Laganà; Riccardo Pasero, both of Milan; Pietro Tiraboschi, Gussago, all of Italy

[73] Assignee: Snamprogetti S.p.A., Milan, Italy

[21] Appl. No.: 97,785

[22] Filed: Nov. 27, 1979

[30] Foreign Application Priority Data

Dec. 15, 1978 [IT] Italy .................. 30885 A/78

[51] Int. Cl.³ .............................................. B01D 1/26
[52] U.S. Cl. .................................... 159/18; 159/13 R; 202/174
[58] Field of Search ................... 159/18, 13; 202/174

[56] References Cited

U.S. PATENT DOCUMENTS

| | | | |
|---|---|---|---|
| 3,303,106 | 2/1967 | Standiford, Jr. | 159/18 R |
| 3,487,873 | 1/1970 | Bromley et al. | 159/18 R |
| 3,824,154 | 7/1974 | Takada et al. | 202/174 |
| 3,824,155 | 7/1974 | Takada | 202/174 |
| 3,961,658 | 6/1976 | Pagani | 159/18 R |

*Primary Examiner*—Norman Yudkoff
*Attorney, Agent, or Firm*—Morgan, Finnegan, Pine, Foley & Lee

[57] ABSTRACT

This invention relates to an apparatus for the desalination of sea water or brine. The apparatus comprises one or more vertical columns divided into a number of cylindrical portions. Each portion constitutes one stage comprising one or more film evaporators formed by vertical tubes, a single brine collection tank of circular section provided with upper lateral apertures, a throttle system, one or more syphon tubes and one or more preheaters having vertical tubes expanded into the same tube plates as the vertical tubes of the film evaporators. The apparatus also comprises pipes and water boxes located inside the tanks for connecting the preheaters of the several stages, connecting pipes between the stages and a final tube bundle condenser positioned below the last stage.

3 Claims, 2 Drawing Figures

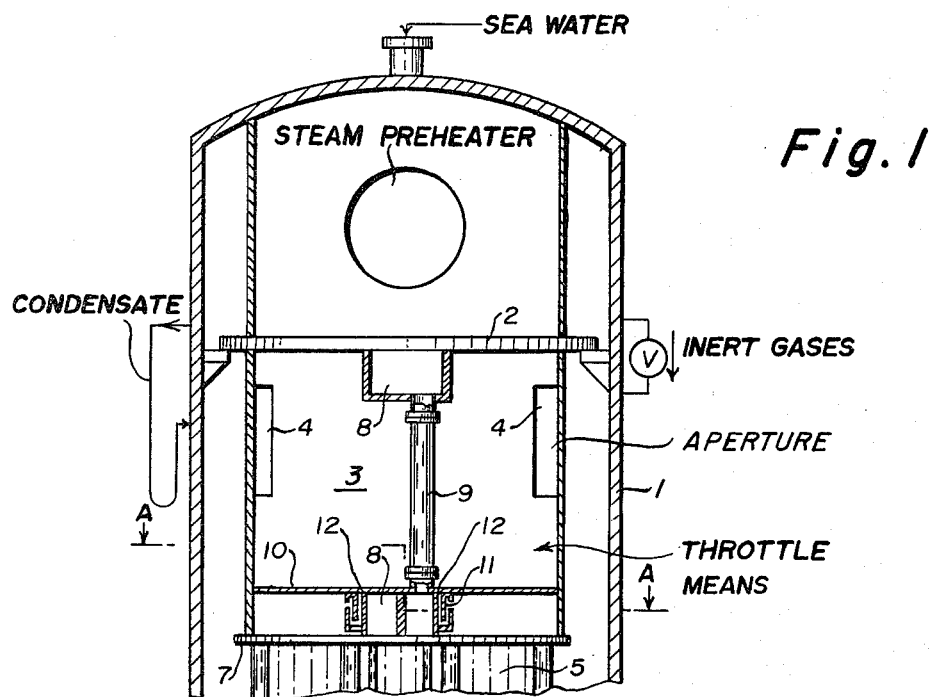
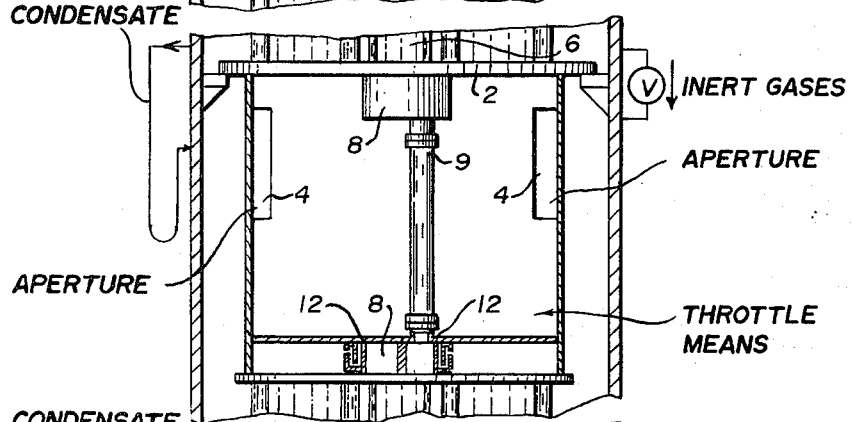
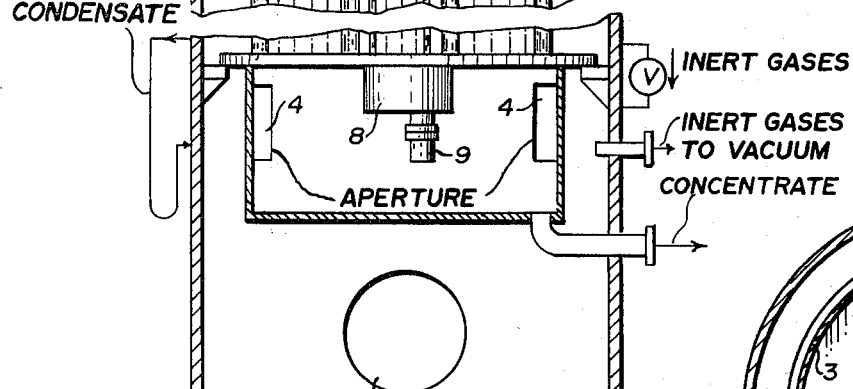
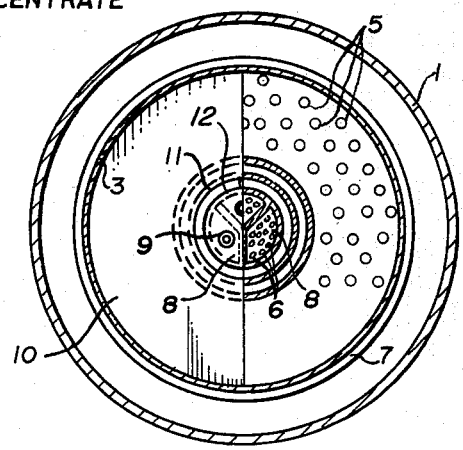
Fig. 1
Fig. 2

APPARATUS FOR DESALTING SEA WATER OR BRACKISH WATER

This invention relates to a further improvement in the apparatus for the desalination of sea water or brine described in U.S. Pat. No. 3,961,658 dated June 8, 1976.

Said apparatus, which operates by a multiple effect process, for the detailed description of which reference should be made to the main text, consists of one or more vertical cylindrical columns divided into various stages, each stage consisting of two vertical liquid film evaporators with circular segment tube plates, between the evaporators there being connected a horizontal preheater for the salt water.

One such stage is suitable for medium or high capacity plants, whereas for plants of reduced and small capacity, a further patent was filed on Dec. 13, 1977 in U.S. Pat. No. 4,062,734.

This patent comprises constructing the evaporator bundle of each stage as a single unit with its tube plate of circular section, and inserting the horizontal preheater into a tube which diametrically traverses the brine tank.

A still further patent filed on Aug. 29, 1978 in U.S. Appln. Ser. No. 937,870 relates to medium and large capacity desalination plants, and comprises disposing the preheater bundles vertically on tube plates which are separate from the tube plates of the evaporators, which in their turn can be constructed in the form of one or more tube bundles.

It has now been found possible to further simplify the desalination apparatus described in the U.S. Pat. No 3,961,658 and second appln. Ser. No. 937,870, with a consequent reduction in its construction costs.

The desalination apparatus according to the present invention is constituted by one or more vertical columns divided into a number of cylindrical portions, each of which constitutes one stage comprising the following elements:

(a) one or more film evaporators in the form of a vertical tube bundle with or without an outer shell;

(b) a brine collection tank connected at its bottom to the upper plate of each evaporator (in the last portion without an evaporator said tank being connected to the brine extraction pipe), and connected at its top to the lower tube plate of the evaporator of the overlying portion, in the first portion said tank being connected to the salt water feed pipe, (c) a throttle system disposed at the base of each tank, with the purpose of allowing the brine to pass from said tank to a second collection tank, the base of which is constituted by the upper tube plate of the underlying film evaporator, and in so doing dissipate the positive pressure difference existing between the tank and said underlying evaporator, (d) apertures in the top of the side walls of each tank, with the exception of those of the first portion, (e) one or more syphon tubes for withdrawing the condensate collected at the base of each portion and to feed it to intermediate points of the next portion, (f) one or more feed preheaters which use the steam produced in each portion as their heating medium, (g) connection pipes between one stage and the next, for transferring any inert gas present to the vacuum pump, (h) a final tube bundle condenser installed in the column and positioned below the last stage, to condense all the steam produced in the last stage.

That which characterises said apparatus, with respect to the already known apparatus according to the second patent of addition, is the fact that in each stage there is a single brine collection tank of circular section, that the vertical tube bundles of the feed preheaters are expanded into the same tube plates as those into which the tubes of the film evaporators are expanded, and that the preheaters of each stage are connected to those of the adjacent stages by pipes and water boxes situated inside the brine collection tanks.

The preheaters can be in a central, peripheral or any other position to the film evaporators, and can be of one or more passes.

A description is given hereinafter of one embodiment of the invention by way of non-limiting example, with reference to FIGS. 1 and 2, in which:

FIG. 1 is a longitudinal section through one stage of the vertical column 1, lying between the tube plates 2.

FIG. 2 is a cross-section on the line AA through the column 1.

FIG. 1 shows the tank 3 which collects the brine from the previous stage, the lamellar separators 4 the purpose of which is to separate the brine droplets from the steam, the tube bundles 5 of the film evaporators and the tube bundles 6 of the preheaters which are expanded at their top into the same tube plate 7. In this embodiment, the preheaters 6 are in a central position to the evaporators 5. Each preheater 6 communicates with the preheaters of the lower and upper stages by way of the water boxes 8 and pipes 9. The water boxes are welded directly to the tube plates, and those situated at the lower end of the tubes 9 form with the circular ring-shaped base 10 of the tanks the self-adjusting syphon 11, which constitutes the throttle system for the passage of the brine from the bottom of the tank to the underlying tube plate 7 of the film evaporator. Opening 12 in base 10 permits the brine to flow from tank 3 to syphon 11, and thence to tube plate 7.

This further modification of the desalination apparatus with respect to the analogous apparatus of the second patent of addition has considerable constructional and economical advantages, including better utilisation of the space available in each stage, a saving of one tube plate for each preheater, the construction of a single tube bundle for each stage, and the simplification of the brine collection tanks by means of a single syphon which regulates the passage of brine from one stage to the next.

We claim:

1. In an apparatus for the desalination of sea water or brine, comprising one or more vertical columns divided into a number of cylindrical sections, each section constituting one stage, and each stage having one or more film evaporators in the form of vertical tube bundles connected to upper and lower tube plates, a syphon tube for withdrawing condensate collected at the base of each section and for feeding said condensate to the next stage, a preheater that uses steam as the heating medium, connection pipes between each stage and the next for transferring any inert gas present to a vacuum pump, and a final tube bundle condenser to condense all the steam produced in the last stage, the improvement comprising:

a brine collection tank in each evaporator section, the base of said tank being constituted by the upper tube plate of the underlying evaporator, with the exception of the lower-most tank which is connected at its bottom to a brine extraction pipe, and the top of said tank being constituted by the bottom of the overlying brine collection tank, except that the uppermost tank is connected at its top to a salt water feed pipe, from which tank the brine passes to the underlying film evaporator or, in the case of the lowermost tank, to a brine extraction pipe;

apertures in the side wall of the brine collection tank, with the exception of the uppermost section;

throttle means disposed at the base of each brine collection tank, to allow the brine to pass from said tank to the underlying section in order to dissipate the positive pressure difference between the brine collection tank and the underlying section;

and wherein said preheater in each section comprises a vertical tube bundle, said bundle being connected to the same tube plates as the tube bundle of the film evaporator, and said preheater being connected to the preheaters of adjacent stages by pipes and waterboxes situated within the collection tanks.

2. The apparatus of claim 1, wherein the preheaters are located centrally within the apparatus.

3. The apparatus of claim 1, wherein said water boxes are welded directly to the tube plates, and, together with the base of the brine collection tanks, form a self-adjusting syphon constituting said throttle means.

* * * * *